Nov. 20, 1934.  F. J. KREUTZER  1,981,421
DISPENSING MEANS
Original Filed Oct. 10, 1932  2 Sheets-Sheet 1
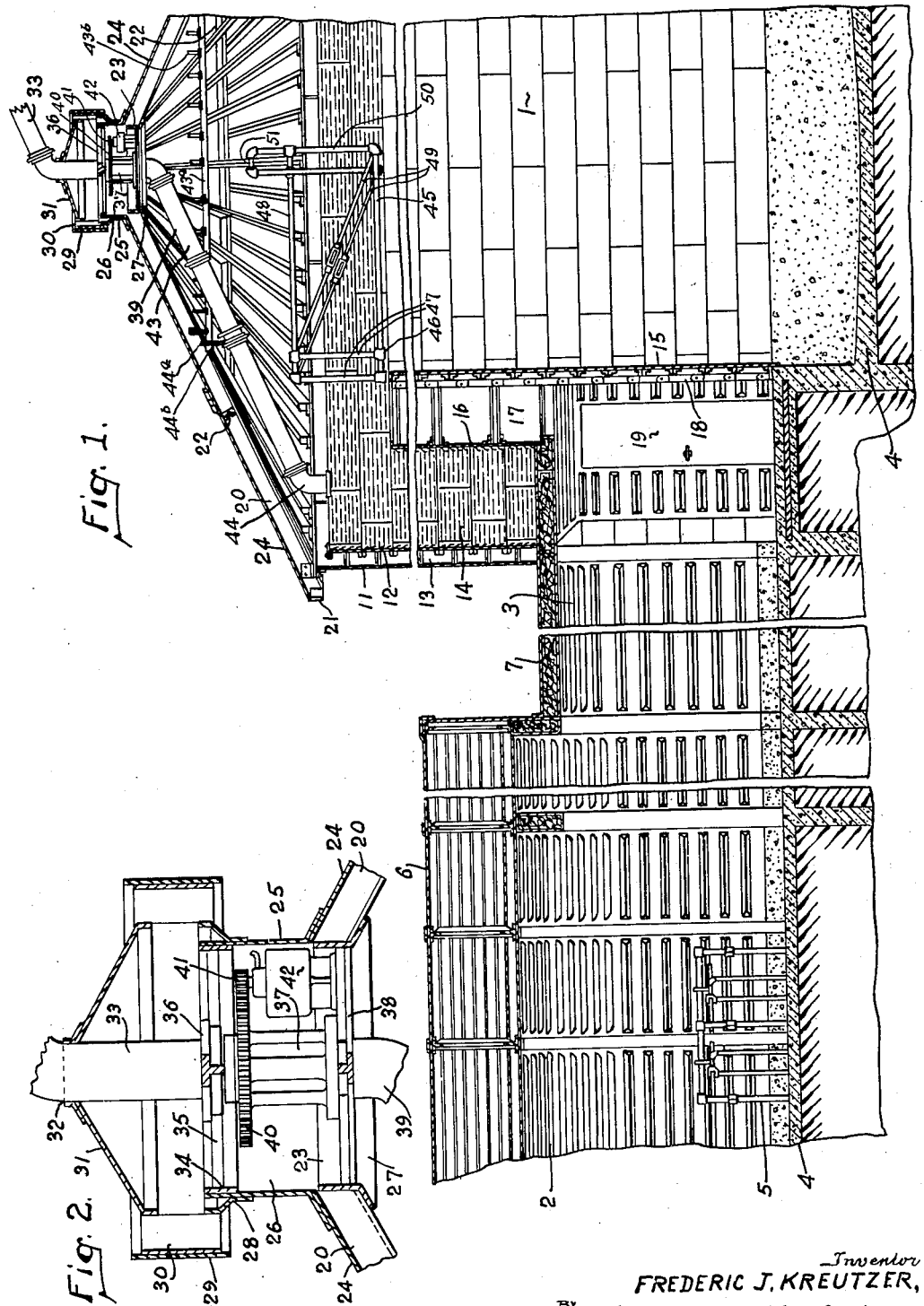
Inventor
FREDERIC J. KREUTZER,
By Toulmin + Toulmin
Attorneys

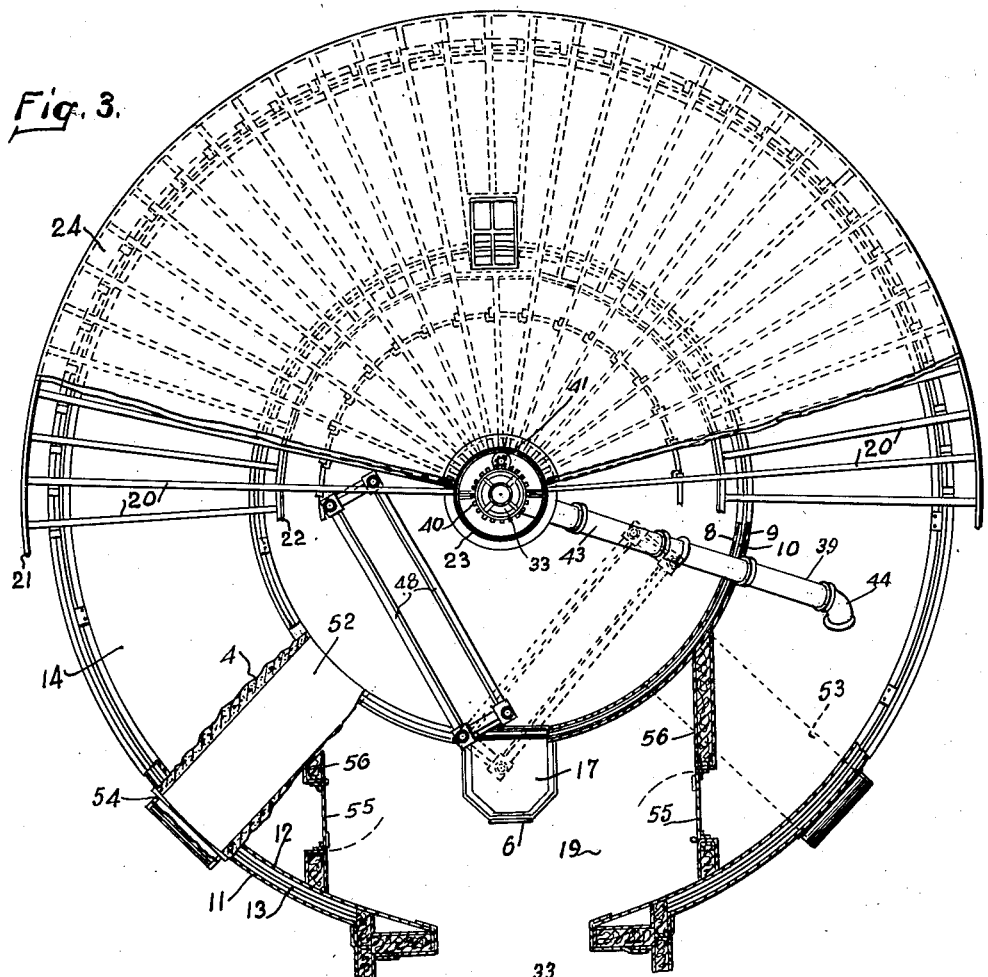
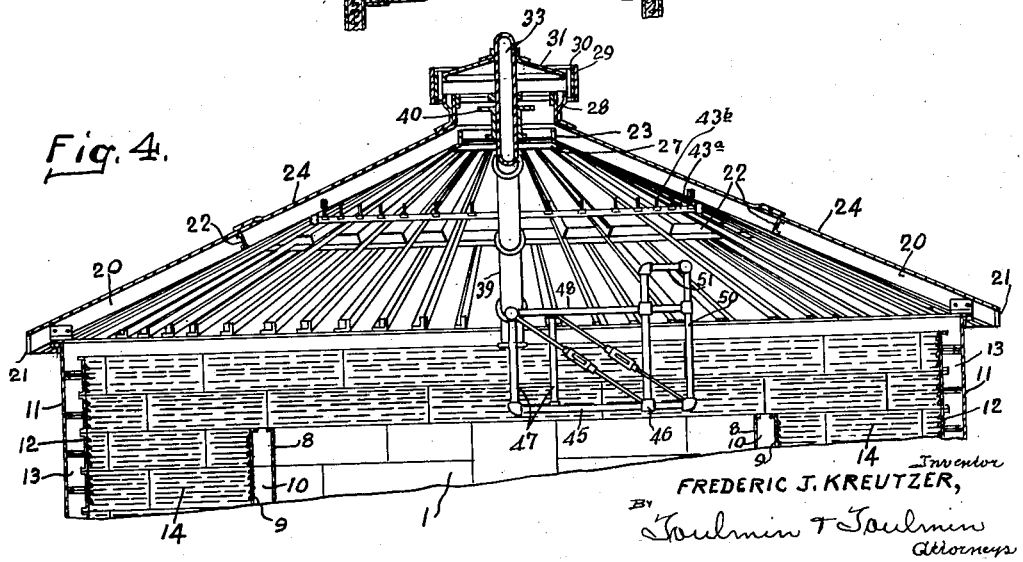

Patented Nov. 20, 1934

1,981,421

UNITED STATES PATENT OFFICE 1,981,421

DISPENSING MEANS

Frederic J. Kreutzer, Elmira, N. Y., assignor to James Manufacturing Company, Fort Atkinson, Wis., a corporation of Wisconsin Original application October 10, 1932, Serial No. 637,027. Divided and this application May 8, 1933, Serial No. 669,897

15 Claims. (Cl. 214—17)

This invention relates to improvements in dispensing means used in connection with the storing of feed in silos, and has for its object to provide means for distributing the feed to all parts of the silo and connected to a source of feed so that the feed may be delivered from the source into the silo and distributed.

It is also an object of this invention to provide, in connection with a silo, a cupola which provides for the escape of air and has means for supporting a rotatably mounted chute for the discharge of material into the silo and the distribution of it to various parts so there is an equal distribution of the feed to all parts of the silo.

These and other advantages will appear from the following description taken in connection with the drawings.

This is a division of my copending application, Ser. No. 637,027, filed October 10, 1932.

Referring to the drawings:

Figure 1 is a vertical section through a silo, a stable and a corridor connecting the stable to the silo, with the stable and silo partly broken away.

Figure 2 is a vertical enlarged section of the cupola mounted on the roof of the silo.

Figure 3 is a top plan view of the silo with a part of the top removed and a part of the wall structure shown in section.

Figure 4 is a vertical section through the top of the silo at right angles to the section on which Figure 1 is taken.

The silo 1 is connected to the stable 2 by means of an interconnecting corridor 3. Each of these parts of the structure has a floor 4. In the stable are the usual stalls 5, which provide inclosures for cattle. The stable has the usual roof 6, while the corridor has a roof 7. The detail structures of the stable and of the corridor are not described as they form no part of the present invention.

The silo or feed storage building has an inner wall 8 composed of interconnected sections. Around the wall 8 and spaced therefrom is a foraminous wall 9. The space between these two walls 8 and 9 is indicated by the numeral 10. Any suitable means may be provided for holding these walls in spaced relationship. The silo has an outer wall 11, which is also formed of interlocking sections. These sections may be of metal, tile or any other similar undestructible material.

Inside of this wall is a foraminous wall 12, which is spaced from the outside wall by a space 13. This space 13 and the space 10 serve as passageways for the passing of air between the walls from the bottom of the silo to the top or from the top to the bottom. The air passing through these spaces or passageways can pass through the foraminous walls into the storage chamber 14 in the annular space between the two foraminous walls 9 and 12.

The inside walls at the silo end of the corridor have removable wall sections 15. These sections may be removed so that the storage chamber may be entered from the interior of the silo. The passageways formed by the removal of these sections enter into a chute 17, which is provided also with removable sections 16 similar to the sections 15 for entrance into the storage chamber. A ladder 18 is provided for scaling the walls of the silo. There is also provided an extension 19 of the corridor inside of the silo.

On the outside wall 11 a plurality of rafters 20 is supported. On the lower ends of these rafters is a lower ring 21. Intermediate the ends of the rafters is a ring 22, while at the upper ends of the rafters is a ring 23. Some of the rafters terminate with the intermediate ring, which serves to support the upper ends of these rafters. A roof 24 is supported by the rafters.

The roof adjacent the upper ends of the rafters and above the upper ring 23 has a cupola wall 25 which extends upwardly and forms a circular passageway 26. The upper ring 23 has an outwardly extending cone-shaped flange 27 beneath the upper ends of the rafters. On the upper end of the wall 25 is a ring 28, the lower edge of which is attached to the wall, while its upper edge is flared out and spaced from the upper end of the wall.

The lower part of the ring 28 supports a relatively large ring 29, which has within it a smaller and narrower ring 30. The rings 29 and 30 are supported on the ring 28 by means of arms, or similar structure not shown. These arms extend from the upper edge of the ring 28 to the lower edges of the rings 29 and 30.

Supported on the upper edges of the rings 29 and 30 is a cone-shaped cap member 31. This cap is supported by the rings 29 and 30 by means of arms, not disclosed. In the upper part of the cap 31 is a hole 32, through which a tube 33 passes. The inner end of this tube is attached to a bearing 36 supported by a ring 34, and arms 35 connecting the bearing to the ring. This ring, bearing and arms form a spider-like construction located in the upper end of the passageway 26 and supported by the wall 25.

The part of the tube or spout 33 extending beyond the cap 31 is connected to some source of feed, which may be a wagon, truck or any other source. Immediately below the bearing 36 is a sleeve 37 supported at its lower end by means of a spider construction 38, similar to the support for the inner end of the tube 33. Attached to the spider 38 and the sleeve 37 is a chute 39. This chute has its sleeve end in alignment with the inner end of the tube or spout 33 so that any feed delivered through the tube 33 will pass into and through the chute 39.

On the upper end of the sleeve 37 is a gear 40 meshing with a pinion 41 located on the motor shaft of a motor 42, which is supported on the spider 38. The chute 39 is composed of a plurality of sections 43. These sections may be added to or taken from the part attached to the sleeve so that the length of the chute as a whole may be varied. On the upper end of the chute is an elbow section forming a spout 44.

For the purpose of supporting the chute 39 intermediate its ends there is provided on the rafters a track 43a, supported from the rafters by means of brackets 43b. On this track is a trolley 44a which is connected to the chute by means of a hanger 44b. The sections 43 instead of being detachable may be telescoped one within the other so that the chute as a whole may be lengthened or shortened by this telescopic construction.

Suitably supported at some part of the inner wall is a swinging platform 45, which has at one end sleeves 46. These sleeves extend upwardly and carry supporting posts 47. It is at one of these posts that the platform is pivoted. The upper ends of these posts have extending therefrom top rails 48. Extending from the upper ends of posts 47 are downwardly inclined stay rods 49. These stay rods extend from the upper ends of the posts 47 to the end of the platform remote from the posts. There are also provided at the end of the platform, opposite the posts 47, corner posts 50 which have rungs 51.

In the floor, and beneath the top surface thereof, is a clean-out passageway 52, which has over its outer end a hood 54. There is provided in the outside wall of the silo an air inlet passageway 53, which has over it a hood 54. On each side of the extension 19 is a wall 56 in which there is a door 55 leading from the passageway into the storage chamber.

The feed, in whatever form it may be, is delivered through the spout 44 into the upper part of the silo, and is discharged into the storage chamber through the spout and may be delivered to any part of the storage chamber by rotating the spout through the operation of the motor. This spout being supported intermediate its ends on the track, and the motor running, the spout end of the chute continually moves around in the top of the silo beneath the roof and discharges the feed as it moves around. The radial distances of the points where the feed is discharged may be regulated because of the telescopic nature of the sections forming the chute.

It will be understood that I desire to comprehend within my invention such modifications as come within the scope of my claims and my invention.

Having thus fully described my invention, what I claim as new and desire to secure by Letters Patent, is:

1. In combination, concentric containers for feed, a common rotary extensible delivery means, a cover fixed to one container common to said containers supporting said rotatable delivery means, and means supported beneath the cover for rotating said delivery means.

2. In combination, a container having a cover with an air passageway therein, means in the passageway for delivering material into the container, and mechanical means supported by and located beneath the cover for rotating the first-named means.

3. In combination, a feed storage building having an air passageway, a delivery pipe supported at one end in the passageway, a discharge chute in the building, a sleeve on one end of the chute in line with the supported end of the pipe, a track for supporting the chute intermediate its ends, and means engaging the sleeve for rotating the sleeve and the chute.

4. In combination, a feed storage building having an air passageway, a delivery pipe supported at one end in the passageway, a sleeve in the passageway in line with the supported end of the pipe, a chute attached at one end to the sleeve, a track in the building, means movable on the track to support the chute intermediate its ends, and means engaging the sleeve to cause the first-named means to move along the track to swing the chute.

5. In combination, a feed storage building having a roof with a passageway therein, a delivery chute having on one end a sleeve rotatably mounted in the passageway, a circular track supported by the roof, a trolley on the track to support the chute intermediate its ends, means engaging the sleeve to cause the trolley to move along the track, and means to deliver material to the end of the chute in the passageway.

6. In combination, a feed storage building having a roof with a passageway therein, a sleeve rotatably mounted in the passageway, a delivery chute attached at one end to the sleeve, a traveling member to support the chute intermediate its ends, a motor operatively connected to the sleeve to rotate it and the chute, and means to deliver feed material to the sleeve and the chute.

7. In combination, a feed storage building having a roof with a passageway therein, a spider member in the passageway, a sleeve rotatably supported by the spider member, a delivery chute attached at one end to the sleeve, a motor on the spider member operatively connected to the sleeve to rotate it and swing the chute, and a delivery pipe having one end supported in line with the sleeve and the sleeve end of the chute.

8. In combination, a feed storage building having a roof with a passageway therein, a cupola wall around the passageway, a spider member in the passageway on the wall, said spider member forming a bearing, a sleeve rotatably mounted in the bearing, a delivery chute attached at one end to the sleeve, an electric motor on the spider member, and a gear connection between the motor shaft and the sleeve for rotating the sleeve.

9. In combination, a feed storage building having a roof with a passageway therein, a cupola having a wall around the passageway, a spider member in the passageway on the wall, said spider member forming a bearing, a sleeve rotatably mounted in the bearing, a delivery chute attached at one end to the sleeve, a track supported by the roof, a traveling member on the track connected to the chute intermediate its ends, a motor on the spider member operatively connected to the sleeve to rotate the sleeve and swing the chute, a second spider member in the passageway on the wall, said second spider member forming a bearing, and a delivery pipe mounted at one end in the last-named bearing in line with the sleeve and the sleeve end of the chute.

10. In combination, a silo, a plurality of converging rafters, each rafter supported at its lower end by the wall of the silo, a ring to which the upper ends of the rafters are attached, a circular wall substantially in line with the ring, a chute rotatably supported at one end by the ring, a pipe supported at one end by the wall in line with the chute, and means on the rafters to support the chute intermediate its ends so that it may swing.

11. In combination, a silo having a wall, a plurality of converging rafters, each rafter supported at its lower end by the wall, a ring to which the upper ends of the rafters are attached, a chute rotatably supported at one end by the ring, a track on the rafters having means thereon to support the chute intermediate its ends, and means to rotate the ring end of the chute and cause its other end to swing around in the silo.

12. In combination, a silo having a wall, a plurality of converging rafters, each rafter supported at its lower end by the wall, a ring to which the upper ends of the rafters are attached, a chute rotatably supported at one end by the ring, a track on the rafters having means thereon to support the chute intermediate its ends, and a motor supported on the ring to rotate the ring end of the chute and cause its other end to swing around in the silo.

13. In combination, a silo having a wall, a plurality of converging rafters, each rafter supported at its lower end on the wall, a ring to which the upper ends of the rafters are attached, a sleeve rotatably supported by the ring, a chute attached at one end to the sleeve, means on the ring to rotate the sleeve and swing the other end of the chute, and a traveling member supported by the rafters to support the chute intermediate its ends.

14. In combination, a silo having a wall, a plurality of converging rafters, each rafter supported at its lower end on the wall, a ring to which the upper ends of the rafters are attached, a sleeve rotatably supported by the ring, a chute attached at one end to the sleeve, a motor on the ring to rotate the sleeve and swing the other end of the chute, and a traveling member supported by the rafters to support the chute intermediate its ends.

15. In combination, a feed storage building having an air passageway therein, a chute in the building having one end in the passageway, sleeve means mounted for rotation in the passageway to rotatably support one end of the chute, a track in the building, means movable on the track to support the chute intermediate its ends, means acting on said sleeve to cause the movable means to move along the track, and means to deliver material to the chute at the passageway.

FREDERIC J. KREUTZER.